(12) United States Patent
Kelley et al.

(10) Patent No.: US 11,483,209 B2
(45) Date of Patent: Oct. 25, 2022

(54) FORWARD PROGRESS MECHANISMS FOR A COMMUNICATIONS NETWORK HAVING MULTIPLE NODES

(71) Applicant: Advanced Micro Devices, Inc., Santa Clara, CA (US)

(72) Inventors: John Kelley, Fort Collins, CO (US); Kartik Shenoy, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 114 days.

(21) Appl. No.: 16/688,814

(22) Filed: Nov. 19, 2019

(65) Prior Publication Data
US 2021/0152432 A1 May 20, 2021

(51) Int. Cl.
*H04L 41/12* (2022.01)
*H04L 43/0894* (2022.01)

(52) U.S. Cl.
CPC .......... *H04L 41/12* (2013.01); *H04L 43/0894* (2013.01)

(58) Field of Classification Search
CPC . H04L 41/12; H04L 43/0894; H04L 41/0893; H04L 43/16
See application file for complete search history.

(56) References Cited

U.S. PATENT DOCUMENTS

| | | | | |
|---|---|---|---|---|
| 4,768,188 A * | 8/1988 | Barnhart | .................... | H04J 3/08 370/434 |
| 5,541,759 A * | 7/1996 | Neff | ........................ | H04B 10/27 398/139 |
| 5,729,550 A * | 3/1998 | Nakajima | ................. | G06F 5/06 370/242 |
| 5,809,220 A * | 9/1998 | Morrison | ........... | G05B 19/4185 714/12 |
| 6,789,203 B1 * | 9/2004 | Belissent | .............. | H04L 47/193 726/22 |
| 7,099,287 B1 * | 8/2006 | Oz | .......................... | H04L 12/42 370/258 |
| 10,277,627 B1 * | 4/2019 | Mehta | ............... | H04W 28/0289 |

(Continued)

OTHER PUBLICATIONS

CIDON and OFEK, MetaRing—A Full Duplex Ring with Fairness and Spatial Reuse, IEEE INFOCOM '90, Jun. 1990.

*Primary Examiner* — Ayaz R Sheikh
*Assistant Examiner* — Tarell A Hampton
(74) *Attorney, Agent, or Firm* — Park, Vaughan, Fleming & Dowler LLP

(57) ABSTRACT

A communication network includes: a plurality of nodes in a topology, with each node having an upstream and a downstream neighboring node in the topology; a separate unidirectional communication link coupled between each node and that node's downstream neighboring node; and a separate unidirectional control link coupled between each node and that node's upstream neighboring node. A controller in each node keeps a count of packets sent by that node via the corresponding unidirectional communication link. The controller uses the count of packets sent to determine whether a given packet is allowed to be sent from that node to the downstream neighboring node and, if so, whether a full rate or a throttled rate is to be used for sending the given packet. Based at least in part on the determining, the controller selectively sends the given packet to the downstream neighboring node.

20 Claims, 7 Drawing Sheets

(56) References Cited

U.S. PATENT DOCUMENTS

| | | | |
|---|---|---|---|
| 2006/0092856 A1* | 5/2006 | Mitsumori | H04L 1/22 370/254 |
| 2006/0155831 A1* | 7/2006 | Chandrasekaran | H04L 67/1097 709/220 |
| 2007/0268913 A1* | 11/2007 | Denecheau | H04L 12/4641 370/397 |
| 2011/0211449 A1* | 9/2011 | Attar | H04L 47/34 370/235 |

* cited by examiner

FORWARD PROGRESS MECHANISMS FOR A COMMUNICATIONS NETWORK HAVING MULTIPLE NODES

BACKGROUND

Related Art

Some electronic communications networks include multiple nodes (e.g., computing devices, network devices, etc.) that are arranged in a topology such as a ring, a mesh, or a star. In some of these communication networks, each node has an upstream neighboring node and a downstream neighboring node in the topology. Each node is connected to its upstream and downstream neighboring nodes via separate unidirectional communication links (e.g., serial or parallel buses or signal lines). The nodes communicate with other nodes by sending and forwarding packets (or messages, data units, bit sequences, etc.) on the unidirectional communication links between the nodes. More specifically, when sending a packet to a destination node in a communication network, a source node sends the packet to the source node's downstream neighboring node via the corresponding unidirectional communication link. When the downstream neighboring node is the destination node, the downstream neighboring node processes the packet. Otherwise, the downstream neighboring node forwards the packet to its own downstream neighboring node via the corresponding unidirectional communication link. In this way, the packet is forwarded from node to node though the topology until reaching the destination node.

In some of the above-described communication networks, the unidirectional communication links are only able to handle one packet per cycle of a controlling clock (i.e., a clock in the communication network via which the nodes are synchronized). When a node is forwarding a packet received from an upstream neighboring node in a given clock cycle, therefore, the node is unable to send the node's own packet during the given clock cycle. This can lead to partial or complete "starvation" of nodes, and thus an unfair/undesirable balance of the consumption of bandwidth in the communication network, when one or more upstream nodes are sending packets in many or all of the cycles of the controlling clock. In other words, a node can be blocked from sending its own packets when upstream nodes are sending sufficient packets to occupy the available clock cycles.

In order to reduce the effects of starvation and in an attempt to ensure that nodes in communication networks are able to use specified percentages of clock cycles for sending packets (e.g., equal percentages for all nodes), designers have proposed using a "control token" to enable the nodes to send packets in situations in which upstream nodes might otherwise block the nodes from sending packets. Generally, in such communication networks, separate unidirectional control links are connected between each node and its upstream neighboring node in the topology. The control token, which can be as simple as a single binary bit, is passed from node to node to make trips through the topology in a direction in reverse of the direction in which packets are sent. Each node maintains a count of packets sent and operates under a rule that at most a maximum threshold value worth of packets (e.g., 16, 20, etc.) can be sent between the last time that the control token was passed on from that node and the control token arriving back at that node. In other words, while the control token makes a trip through all the nodes in the topology, that node can send packets until the count of packets sent equals the maximum threshold value. Each node also operates under a rule that, when that node receives the control token from a downstream neighboring node, when that node has no packets to send or that node has already sent a minimum threshold value worth of packets (e.g., 8, 12, etc.), that node passes the control token to that node's upstream neighboring node in a next clock cycle. Thus, the control token may be passed from node to node as rapidly as in each clock cycle. When passing the control token to an upstream neighboring node, each node resets its count of packets sent, which frees that node to send another maximum threshold value worth of packets while the control token makes the subsequent trip through the nodes in the topology. In contrast, when that node receives the control token from a downstream neighboring node, has packets to send, and has not already sent the minimum threshold value of packets, that node holds the control token (i.e., does not pass the control token to the upstream neighboring node in the next clock cycle). While holding the control token, that node is free to send packets until that node's count of packets sent is equal to the minimum threshold value. By holding the control token, that node prevents the control token from passing through the nodes in the topology and enabling the reset of counts of packets sent in the other nodes. The other nodes will therefore send up to the maximum threshold value of packets and then stop sending packets. Even where one or more upstream nodes are sending packets, each upstream neighboring node eventually sends at most the maximum number of packets before stopping sending packets. This means that the one or more nodes that are preventing that node from sending packets are stopped, at some point, from sending packets, which frees the node that holds the control token to send up to the minimum number of packets before passing the control token on to that node's upstream neighboring node. One example of such a communication network is described by I. Cidon and Y. Ofek in *MetaRing—A Full-Duplex Ring with Fairness and Spatial Reuse*, IEEE Transactions on Communications, Vol. 41, January 1993.

Although using the control token can help to ensure that all nodes make some forward progress—i.e., are each given a chance to send at least some packets—nodes can still experience inefficient operation when using the control token. For example, because holding the control token can eventually stop all nodes in a topology from sending packets, nodes that are not near a starved node (e.g., on the "other side" of a larger topology), are not involved in the starvation of the starved node, and/or are not in a communication range of the starved node (e.g., are further than a specified number of nodes away from the starved node in the topology) may be stopped from sending packets due to the starved node holding the control token. The existing use of control tokens is therefore suboptimal.

BRIEF DESCRIPTION OF THE FIGURES

Throughout the figures and the description, like reference numerals refer to the same figure elements.

DETAILED DESCRIPTION

Figure 1:
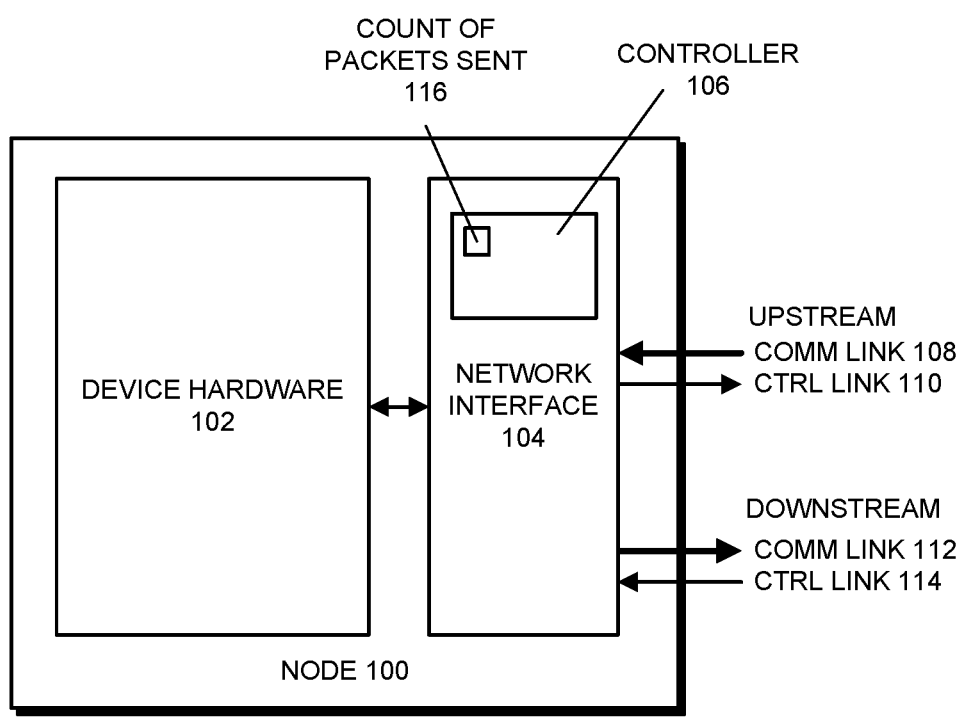
FIG. 1 presents a block diagram illustrating a node in accordance with some embodiments.

The following description is presented to enable any person skilled in the art to make and use the described embodiments and is provided in the context of a particular application and its requirements. Various modifications to the described embodiments will be readily apparent to those skilled in the art, and the general principles defined herein may be applied to other embodiments and applications. Thus, the described embodiments are not limited to the embodiments shown, but are to be accorded the widest scope consistent with the principles and features disclosed herein.

Terminology

In the following description, various terms are used for describing embodiments. The following is a simplified and general description of one of these terms. Note that this term may have significant additional aspects that are not recited herein for clarity and brevity and thus the description is not intended to limit this term.

Functional block: functional block refers to a group, collection, and/or set of one or more interrelated circuit elements (or "circuitry") such as integrated circuit elements, discrete circuit elements, etc. The circuit elements are "interrelated" in that circuit elements share at least one property. For example, the interrelated circuit elements may be included in, fabricated on, or otherwise coupled to a particular integrated circuit chip or portion thereof, may be involved in the performance of given functions (computational or processing functions, memory functions, etc.), may be controlled by a common control element and/or a common clock, etc. A functional block can include any number of circuit elements, from a single circuit element (e.g., a single integrated circuit logic gate) to millions or billions of circuit elements (e.g., an integrated circuit memory).

Overview

In the described embodiments, an electronic communication network includes multiple nodes (e.g., computing devices, network devices, sensors, etc.) arranged in a topology (e.g., a ring, a star, a mesh, etc.). In the topology, each node has an upstream neighboring node and a downstream neighboring node. Each node is connected to that node's downstream neighboring node via a separate unidirectional communication link. Each node uses the communication links for sending packets (or messages, bit sequences, etc.) from that node to that node's downstream neighboring node. Each node is also connected to that node's upstream neighboring node via a separate unidirectional control link. Each node uses the control link for passing a control token to that node's upstream neighboring node. The control token, which is passed from node to node in the topology using the respective unidirectional control links, is used by the nodes in operations for ensuring that the nodes in the topology make forward progress in sending their own packets, as described in more detail below.

In the described embodiments, packets sent by a source node are forwarded from node to node through the topology via respective communication links until reaching an intended destination node. For example, a destination node may be two nodes away from a source node in the topology. In this case, the source node sends the packet to the destination node by sending the packet to its downstream neighboring node, which is the first of the intervening nodes, via the respective communication link. The first of the intervening nodes then forwards the packet to the second of the intervening nodes via the respective communication link. The second of the intervening nodes next forwards the packet to the destination node via the respective communication link. In this way, the packet progresses through the topology to the destination node in a series of node-to-node "hops." In the described embodiments, the nodes give priority to packets from upstream neighboring nodes. When a given node has received packets from an upstream neighboring node, therefore, the given node forwards those packets in each clock cycle—and will not send its own packets in clock cycles in which packets are forwarded. Without the mechanisms described herein for controlling the sending of packets by nodes in the topology, "starvation" can occur—i.e., a node can be partially or completely blocked by upstream nodes from sending its own packets. This can lead to an unfair/undesirable balance of the consumption of bandwidth in the communication network—i.e., to one or more nodes using more than a desired (e.g., equal) share of communication network bandwidth.

In some embodiments, one of the operations for ensuring forward progress involves using a count of packets sent in each node and respective thresholds for the count of packets sent to determine if packets are permitted to be sent by that node and, if so, whether a throttled rate or a full rate is to be used for sending the packets. For this operation, a given node increments the count of packets sent upon sending each of the given node's own packets to the downstream neighboring node via the corresponding communication link, thereby keeping a record of a number of packets sent. As long as the count of packets sent is lower than a minimum threshold value (which can be 8, 16, or another number) and the given node does not have packets from the upstream neighboring node to be forwarded, the given node can freely send its own packets during each cycle of a controlling clock (or "clock cycle"). The given node can "freely" send its own packets in that the given node is not throttled in sending packets and therefore can send packets at the full rate for sending packets. For example, the full rate for sending packets can be one packet per clock cycle (i.e., a full rate of 1:1). On the other hand, when the count of packets sent is equal to or greater than the minimum threshold value but less than a maximum threshold value (which can be 32, 64, or another number) and the given node does not have packets from the upstream neighboring node to be forwarded, the given node sends the given node's own packets at a throttled rate. For the throttled rate, the given node is limited to sending the given node's own packets in less than all clock cycles, i.e., in a specified fraction or proportion of the clock cycles. For example, the given node may send packets in one out of every three clock cycles for the throttled rate (i.e., a throttled rate of 1:3). Sending packets at the throttled rate avoids the given node sending packets in every clock cycle, which frees some of the clock cycles for use by downstream nodes in sending their own packets.

When the count of packets sent is equal to the maximum threshold, the given node halts sending its own packets. The given node does not again send given node's own packets until the count of packets is reset/zeroed (an operation that involves the control token, as described below). Halting sending packets means that the given node does not send packets in any clock cycle, thereby freeing all of the clock cycles for use by downstream nodes in sending their own packets.

In the described embodiments, within the communication network, the control token, which can be as simple as a single binary bit, is passed from node to node through the topology via respective control links. In other words, the control token is forwarded from node to node in the topology, thereby making repeated trips through the nodes in the topology in a direction in reverse to that of the direction in which packets travel in the communication network. Upon receiving the control token, each node uses the token to make forward progress in sending that node's own packets. More specifically, upon receiving the control token, each node determines whether that node has packets to send—and thus may have been facing starvation—and whether that node's count of packets sent is less than the minimum threshold. When that node has no packets to send or that node's count of packets sent is equal to or greater than the minimum threshold, that node passes the control token to the upstream neighboring node via the corresponding control link in the next clock cycle. That node also, when passing on the control token, zeroes/resets the count of packets sent (which has the effect of enabling that node to again send that node's own packets, as described above). Otherwise, when that node has packets to send and that node's count of packets sent is less than the minimum threshold, that node holds, i.e., does not pass on, the control token. That node then, while holding the control token, can freely send packets to the downstream neighboring node via the corresponding communication link. It is possible that upstream neighboring nodes are (and have been) sending sufficient packets to that node, however, that that node is busy forwarding packets and cannot send its own packets. By holding the control token, that node prevents upstream nodes from resetting their own counts of packets sent. The upstream nodes will therefore, if they continue to send their own packets, eventually hit the minimum threshold, leading to the upstream nodes using the throttled rate, and the maximum threshold, leading to the upstream nodes halting sending packets. This provides opportunities for that node to send that node's own packets in clock cycles that are not consumed in forwarding packets from the upstream nodes. When subsequently sending packets, that node increments that node's own count of packets sent, which eventually reaches the minimum threshold value, causing that node to pass on the control token and reset/zero its own count of packets sent. In this way, that node gets some protection from upstream nodes for sending up to a minimum threshold value of its own packets, thereby ensuring forward progress for that node.

In some embodiments, the throttled rate is a fixed rate. In these embodiments, regardless of the value of the count of packets sent between the minimum threshold and the maximum threshold, the same throttled rate is used by each node for sending its own packets. For example, the throttled rate may be a constant 1:3 (and thus a given node using the throttled rate may be permitted to send one of its own packets every three clock cycles), 1:4, or another rate. In some embodiments, however, the throttled rate is a variable rate that varies in accordance with the count of packets sent by a given node and/or other criteria. In some of these embodiments, higher rates are used for lower counts of packets sent and lower rates are used for higher counts of packets sent. In other words, in these embodiments, as the count of packets sent increases, the variable rate is reduced, which can help to avoid a node starving downstream nodes and/or consuming more than a desired proportion of communication network bandwidth. For example, throttled rate of 1:2 may be used for the lowest counts of packets sent (closer to the minimum threshold) and a throttled rate of 1:8 may be used for the highest counts of packets sent (closer to the maximum threshold), with one or more intermediate throttled rates possibly being used for intermediate counts of packets sent (e.g., 1:4, 1:6, etc.). In some embodiments, the variable throttled rate is set by a controller in each node or another entity including possibly being set for all nodes in the topology by a "master" node from among the nodes or other entity. In some embodiments, the variable throttled rate is set based on one or more operating conditions, packet sending histories, node or communication network workload types or priorities, communication link busyness or idleness, and/or other criteria for individual nodes or groups thereof.

In some embodiments, the above-described minimum threshold for using the throttled rate and the maximum threshold for halting sending packets are fixed. In these embodiments, in other words, the minimum threshold and maximum threshold are set at respective counts of packets sent and do not change. In some embodiments, however, the minimum threshold and/or the maximum threshold are dynamically adjustable and can be set at runtime (i.e., as or after the nodes in the communication network have started up and are operating). In some embodiments, the minimum threshold and/or the maximum threshold are set by a controller in each node or another entity. For example, in some embodiments, a master node from among the nodes or another entity sets the minimum threshold and/or the maximum threshold for all nodes in the topology. In some embodiments, the minimum threshold and/or the maximum threshold are set based on one or more operating conditions, packet sending histories, node or communication network workload types or priorities, communication link busyness or idleness, and/or other criteria for individual nodes or groups thereof.

In some embodiments, the electronic communication network includes two or more separate topologies, each topology being generally similar to the above-described topology in terms of nodes, packet communication, and control token passing and handling within that topology. In these embodiments, the topologies are "separate" in that data is communicated between nodes in the individual topologies, but not between the topologies themselves. The topologies, however, share a control token—and thus a single control token is passed between the topologies. During operation, the control token makes a complete trip though a first of the topologies so that every node in the first topology receives and handles the control token as described above. A controller, or "crossover controller," in a final node of the trip through the first topology forwards the control token to the second topology via a crossover control link. A crossover controller in the second topology receives the control token from the crossover controller in the first topology and starts the control token on a trip through the second topology. The control token then makes a complete trip though the second topology so that every node in the second topology receives and handles the control token as described above. The crossover controller, which is in a final node of the trip through the second topology, forwards the control token back to the first topology via the crossover control link. In this way, the control token passes back and forth between the first topology and the second topology, being used to ensure forward progress and fairness for nodes separately in each topology.

By using the count of packets sent and the control token to control when and how nodes in a topology are able to send their own packets, the described embodiments help to ensure forward progress of nodes (i.e., avoid starvation and/or ensure fair access for sending packets) without unnecessarily hampering the forward progress of other nodes. By passing the control token between two topologies, the described embodiments help to ensure forward progress for nodes in both topologies. Ensuring forward progress improves, from the perspective of individual nodes, the communication of packets in the topology, which is an improvement to the overall operation of the communication network. Improved operation of the communication network results in increased satisfaction for the users of the nodes and the communication network.

Node

FIG. 1 presents a block diagram illustrating node 100 in accordance with some embodiments. Node 100 includes device hardware 102 and network interface 104. Device hardware 102 is a functional block that performs operations such as computational, control, input/output (IO), sensing, and/or other operations in node 100. For example, in some embodiments, device hardware 102 is or includes one or more central processing unit (CPU) cores, graphics processing unit (GPU) cores, embedded processors, and/or application specific integrated circuits (ASICs) that perform general purpose computational, control, and/or other operations. As another example, device hardware 102 includes data storage and access circuit elements and devices such as high-capacity semiconductor memories, disk drives, etc. As yet another example, in some embodiments, device hardware 102 is or includes a sensor such as a video or audio recording device. Generally, the operations performed by device hardware 102, and thus the particular circuit elements and devices found in device hardware 102, depend on the nature of node 100 (i.e., the particular type of device of node 100). In the described embodiments, device hardware 102 includes sufficient circuit elements and devices to perform the operations herein described.

Network interface 104 is a functional block that performs operations associated with communicating on an electronic communication network such as a network that uses the Ethernet standard (e.g., Institute of Electrical and Electronic Engineers (IEEE) 802.3 and subsequent/related standards) and/or another network standard or protocol. In some embodiments, network interface 104 includes circuit elements and devices implementing one or more lower layers, e.g., a physical layer and/or a link layer, of the Open Systems Interconnection (OSI) model, although other/higher layers of the OSI model may be implemented in network interface 104 some embodiments. Network interface 104 includes controller 106, which is a functional block such as a microcontroller, an ASIC, etc. that includes circuit elements and devices perform operations such as handling setup and configuration of network interface 104 and/or device hardware 102, establishing and maintaining communication with other nodes on the communication network, transmitting and receiving communication units associated with the network standard in use (herein called "packets," although other forms of communication unit can be used), transmitting, receiving, and processing a control token, etc. For example, in some embodiments, controller 106 assembles and prepares packets from higher layers of the OSI model (e.g., provided by device hardware 102) for transmission on a communication link, receives packets via the communication link and prepares the packets for processing in the higher layers of the OSI model, etc.

Controller 106 is connected to a unidirectional communication link and a unidirectional control link in each of the upstream direction (i.e., communications (COMM) link 108 and control (CTRL) link 110) and the downstream direction (i.e., communications (COMM) link 112 and control (CTRL) link 114). In FIG. 1, communication links 108 and 112 are shown using a heavier line than control links 110 and 114. One reason for using the heavier line is to enable easy distinction between communication links and control links (particularly with respect to FIG. 2). Another reason for using the heavier lines is to illustrate that, in some embodiments, communication links 108 and 112 are multi-wire or multi-channel communication links such as parallel communication links. Multi-bit communication links are not a requirement, however, and communication links 108 and 112 can be single-wire or single-channel communication links.

In some embodiments, communication links 108 and 112 and control links 110 and 114 are "unidirectional," which means that traffic (i.e., packets on the communication links and control tokens on the control links) is only permitted to travel in one direction on the links. As can be seen from the arrows in FIG. 1, in the upstream direction (i.e., toward an upstream neighboring node of node 100 in a communication network) communication link 108 is inbound and control link 110 is outbound. Packets are therefore received from the upstream neighboring node via communication link 108 and a control token is sent to the neighboring node via control link 110—but packets and the control token do not travel in the opposite directions.

Controller 106 maintains a count of packets sent 116 (e.g., in a dedicated controller register, etc.). Count of packets sent 116 is a resettable running count of node 100's own packets that have been sent to the downstream neighboring node via communication link 112. Each time that network interface 104 sends a packet to the downstream neighboring node, controller 106 increments count of packets sent 116. Controller 106 then zeroes/resets count of packets sent 116 when passing the control token to the upstream neighboring node via control link 110. Controller 106 uses count of packets sent 116 to determine if, and at what rate, node 100's own packets are permitted to be sent to the downstream neighboring node via communication link 112. The use of count of packets sent 116 is described in more detail below.

Although shown with a particular number and arrangement of functional blocks, in some embodiments, node 100 includes different or differently arranged functional blocks. For example, in some embodiments, node 100 includes a power subsystem, a human interface subsystem (e.g., display, keyboard, mouse, etc.), a memory subsystem, etc. Generally, in the described embodiments, node 100 includes sufficient functional blocks to perform the operations described herein.

Node 100 can be, or can be included in, any electronic device that performs memory access and/or other operations. For example, node 100 can be, or can be included in, electronic devices such as desktop computers, laptop computers, wearable electronic devices, tablet computers, smart phones, servers, artificial intelligence apparatuses, virtual or augmented reality equipment, network appliances (e.g., switches, routers, network-attached storage, etc.), toys, audio-visual equipment, home appliances, controllers, sensors, etc., and/or combinations thereof.

Topology

Figure 2:
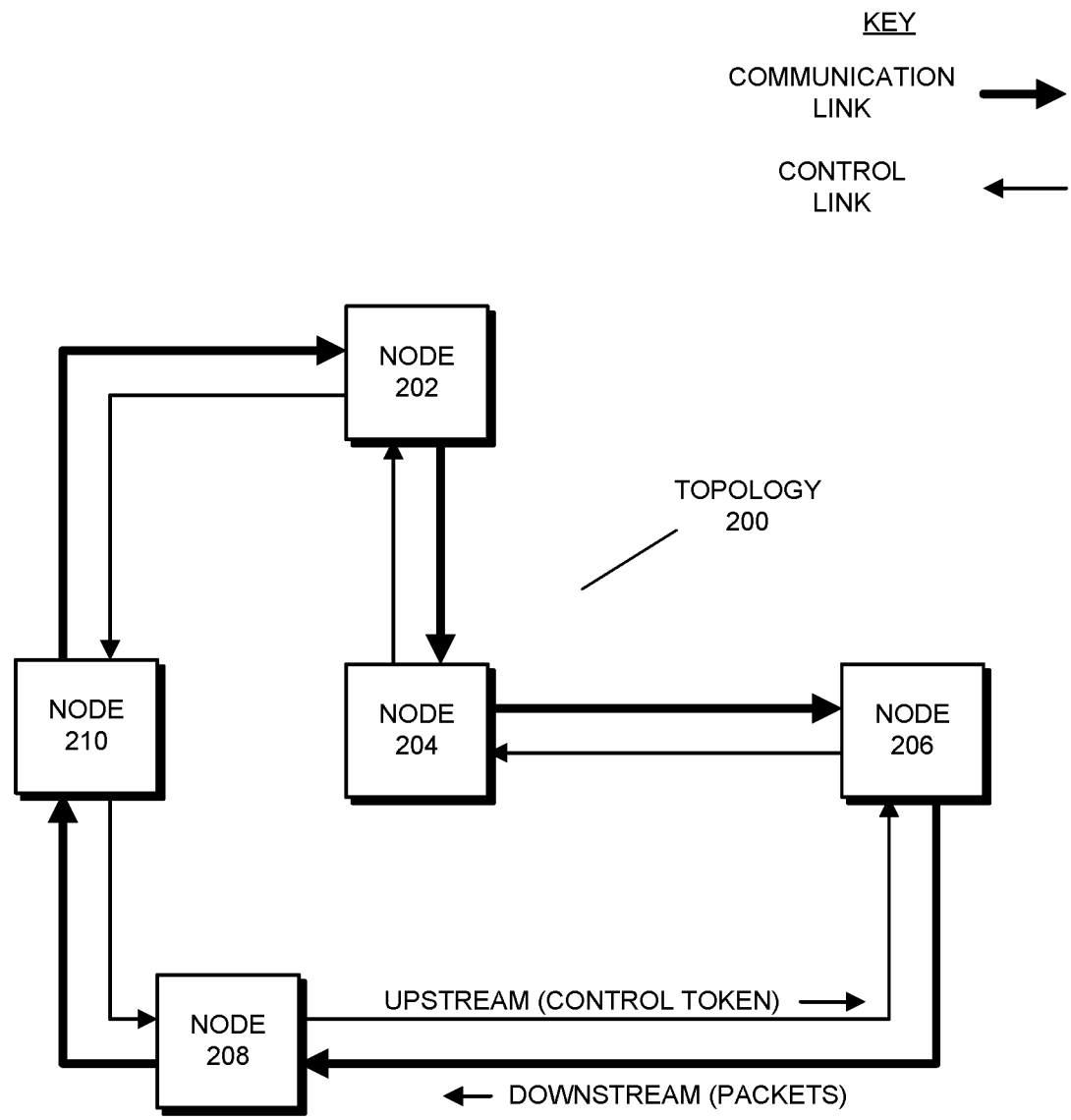
FIG. 2 presents a block diagram illustrating nodes in a topology in accordance with some embodiments.

In the described embodiments, multiple nodes in an electronic communications network are arranged in a topology. In other words, the nodes are connected to one another in a specified pattern. FIG. 2 presents a block diagram illustrating nodes 202-210 in a topology 200 in accordance with some embodiments. Note that the topology shown in FIG. 2 is presented as a general example of a topology in some embodiments. The topology in other embodiments includes a different number or arrangement of nodes. In some embodiments, nodes 202-210 may, but are not required to, have similar internal elements to node 100.

For topology 200, nodes 202-210 are arranged in a ring. Within topology 200, each node has an upstream neighboring node and a downstream neighboring node. For example, node 204 is the downstream neighboring node of node 202 and node 210 is the upstream neighboring node of node 202. As another example, node 208 is the downstream neighboring node of node 206 and node 204 is the upstream neighboring node of node 206.

Each of nodes 202-210 is connected to that node's upstream and downstream neighboring nodes via a separate unidirectional communication link. Packets are, as shown in FIG. 2, sent and forwarded downstream in topology 200 via respective communication links. In other words, packets only travel in a single direction in topology 200—the downstream direction. A packet sent from a source node and destined for a destination node in topology 200 will be received at each intervening node via the respective inbound communication link from that intervening node's upstream neighboring node and forwarded to a next downstream intervening node or the destination node via the respective communication link. For example, assuming that node 202 is the source node and node 208 is the destination node, node 202 initially sends a packet to node 204 via the unidirectional communication link connected between nodes 202 and 204. Node 204 receives the packet and then forwards the packet to node 206 via the unidirectional communication link connected between nodes 204 and 206. Node 206 receives the packet and then forwards the packet to destination node 208 via the unidirectional communication link connected between nodes 204 and 206. Node 208 receives and processes the packet. In this way, packets travel around topology in a series of "hops" from node to node. In some embodiments, the respective downstream neighboring node is the only node in the topology to which each node can send packets.

Each of nodes 202-210 is connected to that node's upstream and downstream neighboring nodes via a separate unidirectional control link. A control token is, as shown in FIG. 2, passed upstream in topology 200 via respective control links. In other words, the control token only travels in a single direction in topology 200—the upstream direction (which is reverse of the direction in which packets travel in topology 200). The control token, which can be as simple as a single binary bit or more complicated, such as being included in a packet, sequence of bits, or message having a specified format, is passed from node to node through the topology via respective control links, making repeated trips or loops through topology 200. That is, the control token is handed from node to node at a maximum rate of one node per N cycles of a controlling clock (or "clock cycles") (where N is a number such as 1, 3, etc.), thereby making trips through the nodes in topology 200 in a specified (upstream) order. When the control token is received at a given node via the respective unidirectional control link, that node determines whether the control token should be held to allow that node to make forward progress in sending its own packets, as described in more detail below. In some embodiments, the respective upstream neighboring node is the only node in the topology to which each node can pass the control token.

Note that "upstream" and "downstream" as used herein are simply references for traffic direction that are used for identifying directions from which packets and the control token are inbound and to which the packets and the control token are outbound at a given node. In some embodiments, the directions are reversed, so that packets travel upstream and the control token travels downstream. Generally, in the described embodiments, the control token is passed around topology 200 in a direction in reverse to that in which packets travel. In addition, although a ring topology is presented in FIG. 2, in some embodiments, a different topology is used. For example, a mesh topology, a star topology, a fully-connected topology, etc. can be used—with the topology having specified communication links and control links used for communicating packets and passing the control token. Also, in some embodiments, the "unidirectional" communication and/or control links may be capable of bidirectional traffic, but may be logically or physically (using circuit elements, etc.) restricted to being used unidirectionally.

Process for Sending Packets by a Node in a Topology

Figure 3:
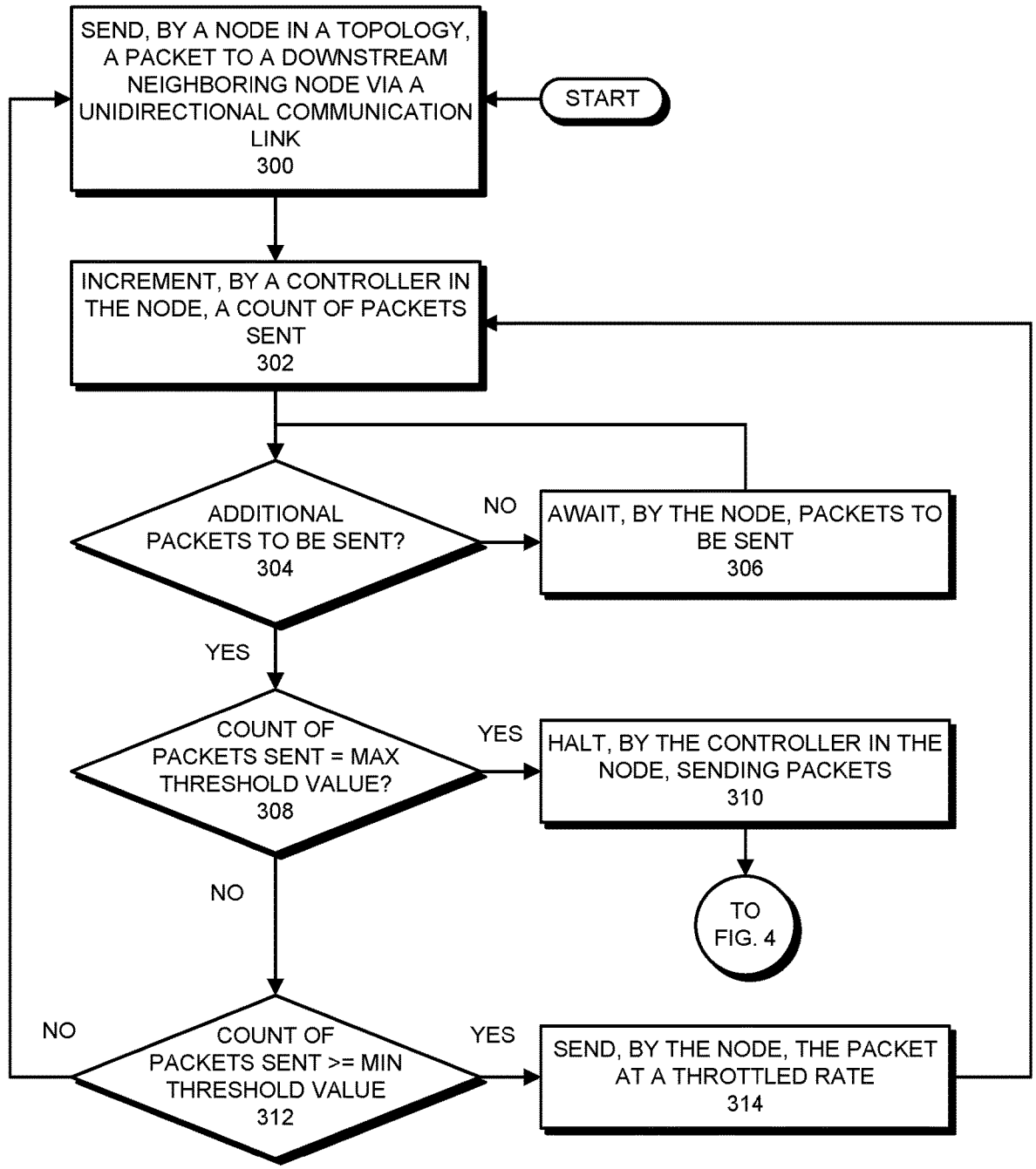
FIG. 3 presents a flowchart illustrating a process for sending packets from a node in a topology in accordance with some embodiments.

In the described embodiments, nodes in a topology (e.g., nodes 202-210 in topology 200) send and forward packets to other nodes in the topology via unidirectional communication links. FIG. 3 presents a flowchart illustrating a process for sending packets from a node in a topology in accordance with some embodiments. Note that the operations shown in FIG. 3 are presented as a general example of operations performed by some embodiments. The operations performed by other embodiments include different operations, operations that are performed in a different order, and/or operations that are performed by different entities or functional blocks.

Figure 4:
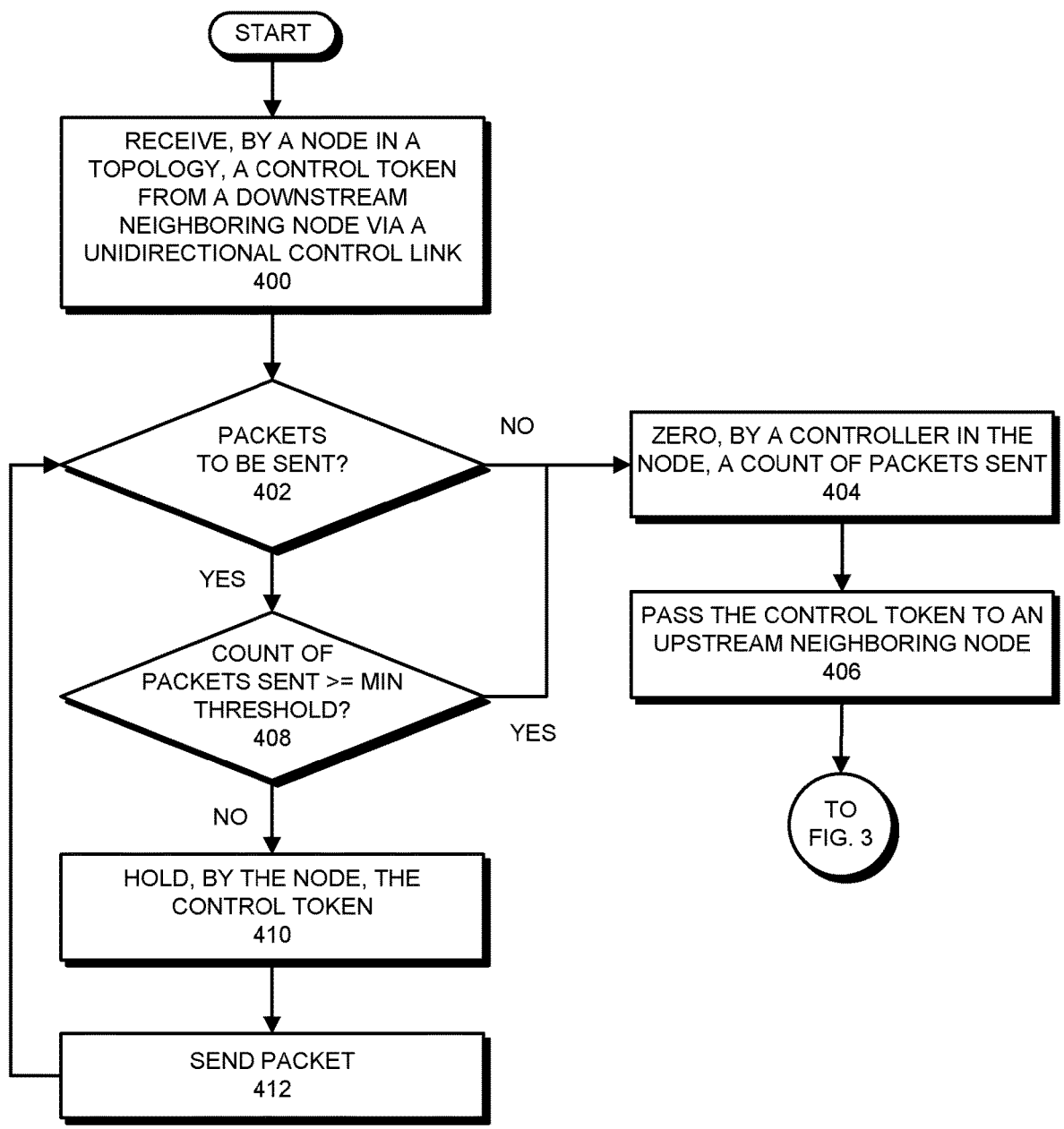
FIG. 4 presents a flowchart illustrating a process for handling a control token in a node in a topology in accordance with some embodiments.

In the flowchart in FIG. 3, following step 310, the flowchart proceeds to FIG. 4 (which illustrates operations performed by a node in topology 200 upon being passed a control token). Proceeding to FIG. 4 as shown illustrates operations after a count of packets sent has been incremented to a maximum threshold value—and the node halts sending packets until the count of packets sent is zeroed/reset. Although this is the only step in FIG. 3 from which operation is shown as proceeding to FIG. 4, in some embodiments, it is possible to proceed to FIG. 4 from other steps in FIG. 3. For example, it may be that no packets to be sent are encountered, as shown in steps 304-306, before the control token is passed to the node, and thus these embodiments may proceed to FIG. 4 from step 306.

For the example in FIG. 3, it is assumed that the count of packets sent is initially less than the minimum threshold and thus packets can be freely sent by a node. It is also assumed that the node has at least one packet to be sent. For example, device hardware 102 may have generated and provided at least one packet to be communicated to a specified destination node. It is further assumed that no packets from a neighboring upstream node are received by the node during the operations in FIG. 3—and thus no packets from upstream nodes are to be forwarded by the node. For the example in FIG. 3, therefore, the node is not prevented from sending its own packets due to the need for forwarding packets received from the upstream neighboring node.

As can be seen in FIG. 3, the process starts when a node in a topology sends a packet to a downstream neighboring node via a unidirectional communication link (step 300). For this operation, a network interface (e.g., network interface 104) in the node receives a packet to be sent, prepares the packet for sending (e.g., by performing operations of one or more lower layers of an OSI model), and sends the packet to the downstream neighboring node via the unidirectional communication link. For step 300, the node sends the packet at a full rate. Sending packets at the full rate involves sending a packet in each cycle of a controlling clock. The node therefore sends the packet in the next clock cycle (recalling that, for the example in FIG. 3, no packets from upstream nodes prevent the sending of the node's packets).

A controller in the node (e.g., controller 106), upon determining that the node sent the packet to the downstream neighboring node, increments the count of packets sent (e.g., count of packets sent 116) (step 302). Recall that the count of packets sent is a resettable running count of that node's own packets that have been sent to the downstream neighboring node. By incrementing the count of packets sent, therefore, the controller records that another packet has been sent by the node.

The controller then determines whether there are additional packets to be sent from the node to the downstream neighboring node (step 304). For example, the controller may check a level of a packet queue or buffer, communicate with device hardware (e.g., device hardware 102) regarding packets to be sent, and/or otherwise determine whether the node has packets to be sent. If not, i.e., if no packets are ready to be sent, the controller waits for packets to be sent (step 306).

When there are packets ready to be sent (step 304), the controller determines whether the count of packets sent is equal to a maximum threshold value (step 308). For this operation, the controller compares the count of packets sent to the maximum threshold value (e.g., a value such as 16, 50, etc.) to determine if they are equal. When the count of packets sent equals the maximum threshold value, the controller causes the node (i.e., the network interface) to halt sending packets (step 310). In other words, despite the node having packets ready to be sent, because the count of packets that were already sent is equal to the maximum threshold, the controller stops the node from sending packets. In this way, the controller can help to prevent the node from sending a sufficient number of packets to starve a downstream node and/or consume more than a specified share of packet-sending bandwidth in the communication network—and thus free the downstream node to send packets in clock cycles in which the node has not sent packets. Once the controller has halted sending packets, the controller waits for the control token to be passed to the node so that the count of packets sent can be reset. Operations involving the control token are shown in FIG. 4, to which the node proceeds following step 310.

When there are packets to be sent (step 304) and the count of packets sent is less than the maximum threshold value (step 308), the controller determines whether the count of packets sent is greater than or equal to a minimum threshold value (step 312). For this operation, the controller compares the count of packets sent to the minimum threshold value (e.g., a value such as 8, 20, etc.) to determine if the count of packets sent is equal to or greater than the minimum threshold. When the count of packets sent is equal to or greater than the minimum threshold value, the controller causes the node (i.e., the network interface) to send the packet at a throttled rate (step 314). Generally, for sending packets at the throttled rate, the node sends a packet in fewer than each cycle of a controlling clock when a packet is available to be sent. For example, the node may send a packet every other clock cycle (a 1:2 throttled rate), every fourth clock cycle (a 1:4 throttled rate), or at a different rate. In other words, the controller causes the node to skip sending packets in specified clock cycles and send packets in other clock cycles. By not sending packets in the specified clock cycles, the node frees the specified clock cycles for use by downstream nodes in sending their own packets.

In some embodiments, sending packets at the throttled rate involves sending packets at variable rates (in terms of clock cycles per packet) based on the count of packets sent and/or other criteria. In these embodiments, the controller performs an additional operation to determine the throttled rate for sending the packet using the count of packets sent. In some embodiments, higher rates (and thus less clock cycles per packet) are used for lower counts of packets sent and lower rates are used for higher counts of packets sent. For example, for count values closer to the minimum threshold value, a 1:2 throttled rate may be used, whereas a rate of 1:8 is used for count values closer to the maximum threshold value. In these embodiments, as a node sends ever more packets via the corresponding communication link, the node initially sends at a higher throttled rate, but eventually begins using a lower throttled rate. By not sending packets in gradually higher numbers of clock cycles, the node frees larger numbers of clock cycles for use by downstream nodes in sending their own packets. In some embodiments, the node uses three or more throttled rates in steps between a highest throttled rate and a lowest throttled rate. For example, in some embodiments, assuming that the minimum threshold value is 10 and the maximum threshold value is 50, between 10-20 count of packets sent, a 1:2 throttled rate is used, between 21-30 count of packets sent, a 1:5 throttled rate is used, between 31-40 count of packets sent, a 1:8 throttled rate is used, and between 41-50 count of packets sent, a 1:12 throttled rate is used.

In some embodiments, although not shown in FIG. 3, the controller and/or another entity (e.g., device hardware in the node, an operating system or software application executed by the device hardware, a remote node or device, etc.) dynamically sets and/or adjusts one or more of the throttled rate, the maximum threshold, or the minimum threshold. In some of these embodiments, the controller uses specified values (e.g., stored in a memory in the node, provided to the node by the device hardware and/or the entity, etc.) to initially set the throttled rate, the maximum threshold, and/or the minimum threshold. During operation in these embodiments, the controller adjusts some or all of the throttled rate, the maximum threshold, and/or the minimum threshold based on one or more criteria or upon receiving a request to do so from the device hardware and/or the entity. For example, the controller, the device hardware, and/or the other entity may keep a history of clock cycles of delay in sending packets (i.e., how long the node and/or other nodes have been halted and/or using the throttled rate(s)), the busyness or idleness of the communication links in the topology, the depth of packet queues or buffers in the nodes, the type of workloads being executed in the node and/or other nodes, the characteristics of packets being sent (e.g., type, size, sequence numbers, etc.), and/or other information about the node, other nodes, and/or the communication network, and may use one or more rules, algorithms, mathematical expressions, etc. to compute or determine one or more of the throttled rate, the maximum threshold, and/or the minimum threshold to be used by the controller for the adjustment.

Returning to FIG. 3, when the count of packets sent is less than the minimum threshold value (Step 312), the process returns to step 300, where the node sends the packet at the full rate.

Process for Handling a Control Token by a Node in a Topology

In the described embodiments, a control token is passed from node to node in a topology (e.g., nodes 202-210 in topology 200) via respective unidirectional control links and used by nodes for controlling the sending of packets. FIG. 4 presents a flowchart illustrating a process for handling a control token in a node in a topology in accordance with some embodiments. Note that the operations shown in FIG. 4 are presented as a general example of operations performed by some embodiments. The operations performed by other embodiments include different operations, operations that are performed in a different order, and/or operations that are performed by different entities or functional blocks.

For the example in FIG. 4, it is assumed that no packets from a neighboring upstream node are received by the node during the operations in FIG. 4—and thus no packets from upstream nodes are to be forwarded by the node. For the example in FIG. 4, therefore, the node is not prevented from sending its own packets due to the need for forwarding packets received from the upstream neighboring node. In addition, for the example in FIG. 4, a control token is assumed to be a single binary bit. "Passing" the control token from a given node therefore means signaling a value of a single binary bit to the given node's downstream neighboring node via the respective control link. For example, driver circuit elements in each node may maintain the control link in a logical low state (e.g., a logical zero, VDD in an integrated circuit, etc.) when the control token is not being passed, and may temporarily/briefly drive the control link to a logical high state for passing the control token (e.g., a logical one, VSS in an integrated circuit, etc.).

As can be seen in FIG. 4, the process starts when a node in a topology receives a control token from a downstream neighboring node via a corresponding unidirectional control link (step 400). For this operation, a network interface (e.g., network interface 104) in the node monitors for the control token, such as by sensing the level of a signal on the control link, and detects/receives the control token accordingly.

A controller in the node (e.g., controller 106) then determines whether the node has packets to be sent (step 402). For example, the controller may check a level of a packet queue or buffer, communicate with device hardware (e.g., device hardware 102) regarding packets to be sent, and/or otherwise determine whether the node has packets to be sent. When the node does not have packets to be sent, the controller zeroes/resets a count of packets sent (step 404). Recall that the count of packets sent is a resettable running total of packets sent to a downstream neighboring node via a corresponding communication link. Zeroing the count of packets sent therefore sets the count of packets sent to indicate that no packets have been sent from the node—since the node last held the control token (or in an initial state). By zeroing the count of packets sent, therefore, the controller resets the node so that the node is able to again send packets at a full rate. Because the node may have been halted from sending packets (as described above for steps 308-310) or sending packets at the throttled rate (as described above for steps 312-314), this operation restores the node to full-rate sending of packets. The node then passes the control token to an upstream neighboring node via the corresponding unidirectional control link (step 406). Once the controller has passed the control token to the upstream neighboring node, the node commences sending packets. Operations for sending packets are shown in FIG. 3, to which the node proceeds following step 406.

When the node has packets to be sent (step 402), the controller determines whether the count of packets sent is equal to or greater than a minimum threshold (step 408). If the count of packets sent is equal to or greater than the minimum threshold value, i.e., if the node has sent at least the minimum threshold value worth of its own packets to a downstream neighboring node, the node passes the control token to the upstream neighboring node. For this operation, the node proceeds to step 404 and performs the subsequent operations as described above.

When the node has packets to be sent (step 402) and the count of packets sent is less than the minimum threshold value (step 408), the controller causes the node to hold the control token (step 410). As used herein, "holding" the control token indicates that the node does not immediately pass the control token (i.e., assert the associated signal on the control link to the upstream neighboring node in the next clock cycle), but instead waits to pass the control token in order to send at least one of the node's own packets. The node then sends a packet to the downstream neighboring node (step 412). For this operation, the node sends the packet to the downstream neighboring node via the corresponding communication link at the full rate. The node then returns to step 402 to determine if the node has more of the node's own packets waiting to be sent.

Process for Forwarding Packets by a Node in a Topology

Figure 5:
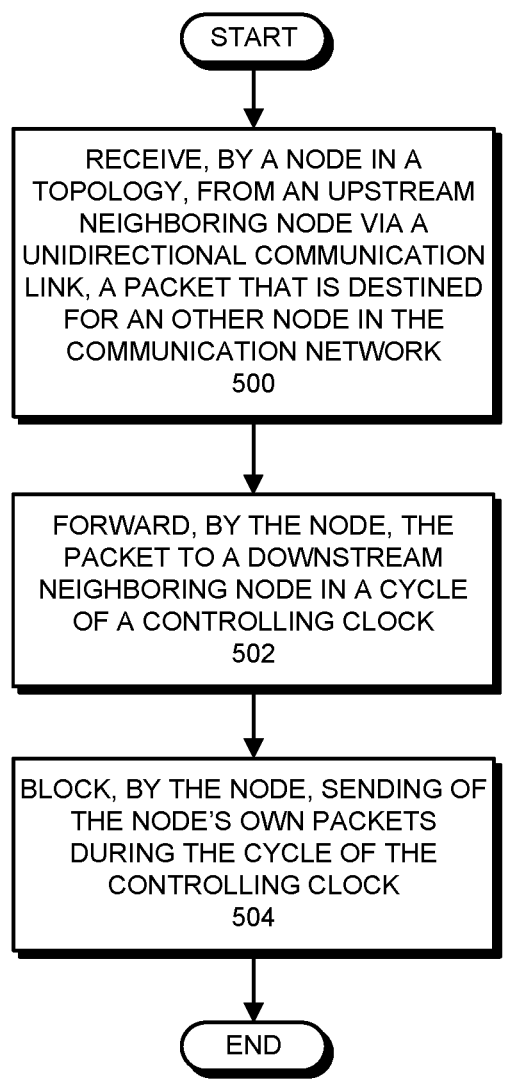
FIG. 5 presents a flowchart illustrating forwarding packets from a node in a topology in accordance with some embodiments.

In the described embodiments, nodes in a topology forward packets received from upstream neighboring nodes. FIG. 5 presents a flowchart illustrating forwarding packets from a node in accordance with some embodiments. Note that the operations shown in FIG. 5 are presented as a general example of operations performed by some embodiments. The operations performed by other embodiments include different operations, operations that are performed in a different order, and/or operations that are performed by different entities or functional blocks.

The process in FIG. 5 starts when a node in a topology receives, from an upstream neighboring node via the corresponding unidirectional communication link, a packet that is destined for an other node in the topology (step 500). For example, node 204 in topology 200 can receive, from node 202, via the corresponding communication link, a packet that is destined for node 206. The node receives the packet via receiving circuit elements such as a receiving buffer, etc. The node then forwards the packet to a downstream neighboring node via the corresponding unidirectional communication link in a cycle of the controlling clock (step 502). In other words, in a next available clock cycle, the node forwards the received packet to the downstream neighboring node.

The node also blocks the sending of the node's own packets during the cycle of the controlling clock (step 504). For this operation, the node gives preference to forwarding the received packet over sending its own packets, as is a policy in the topology/communication network. As described above, without the mechanisms described herein, the operations in FIG. 5 can result in the starvation of the node and/or an unfair/undesirable balance of the consumption of bandwidth in the communication network when the upstream node sends sufficient packets to the node to prevent the node from sending some or all of its own packets.

Packet and Control Token Communication in a Topology

Figure 6:
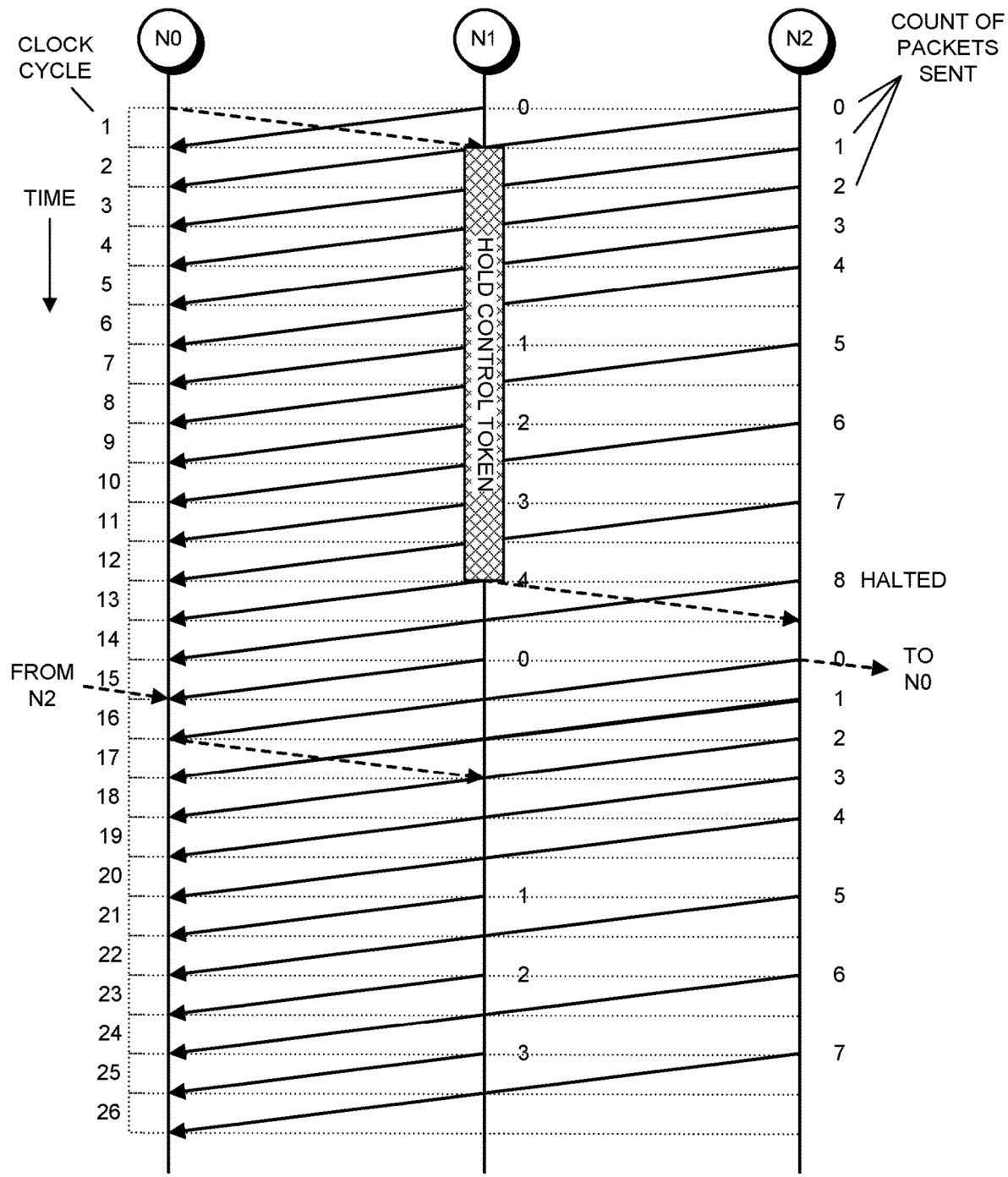
FIG. 6 presents a swim lane diagram illustrating communications of nodes in a topology in accordance with some embodiments.

In the described embodiments, packets are sent from nodes in a topology to other nodes in the topology to communicate data, control values, and/or other information. In addition, a control token is passed from node to node in the topology and used by each node to control the sending of packets by the nodes. FIG. 6 presents a swim lane diagram illustrating communications of nodes in a topology in accordance with some embodiments. Note that the communications shown in FIG. 6 are a general example of communications in accordance with some embodiments. In other embodiments, however, different communications and/or different criteria (e.g., full rate, throttled rate, maximum threshold value, minimum threshold value, etc.) are used.

For the example in FIG. 6, nodes 0-2, i.e., N0, N1, and N2, are located in a topology similarly to nodes 202-206 in topology 200, with N0 being located similarly to node 206, N1 being located similarly to node 204, and N2 being located similarly to node 202. In other words, N0 and N1 are connected via unidirectional communication and control links with N0 downstream from N1 akin to nodes 204 and 206. N1 and N2 are also connected via unidirectional communication and control links with N2 downstream from N1 akin to nodes 204 and 206. Differently than topology 200, however, N2 and N0 are connected to one another via corresponding unidirectional communication and control links so that N2 is downstream from N0 (in terms of packet flow). In other words, N2-N1-N0 are arranged in a ring topology.

For the example in FIG. 6, it is assumed that N1 and N2 both have a larger number of packets to be sent to N0 and N0 has no packets of its own to send. In addition, it is assumed that packets are sent downstream, i.e., from N2 to N1 to N0, and the control token is passed upstream, i.e., from N0 to N1 to N2. In order to communicate packets to N0, therefore, N2 sends packets to N1, which then forwards the packets to N0. The sending and forwarding of the packets is shown using the black solid arrows and the passing of the control token is shown using heavier dashed lines. The packets and the control token each proceed from node to node in corresponding clock cycles, i.e., based on levels and/or transitions of a controlling clock signal for the nodes that oscillates between a logical high level and a logical low level in each cycle of a repeating sequence of cycles. A number of clock cycles are numbered and shown using lighter dashed lines on the left side of FIG. 6—as is the flow of time. For example, in clock cycle 1, a packet is sent from N1 to N0, as shown by the angled black solid arrow— i.e., the packet leaves N1 sometime during clock cycle 1 and is received in N0 by approximately the end of clock cycle 1.

For the example in FIG. 6, the minimum threshold used for determining how packets are allowed to be sent is set to a value of 4. The maximum threshold used for determining how packets are allowed to be sent is set to a value of 8. These values for the thresholds are merely examples and some embodiments use different values. In addition, a full rate for sending packets is a packet per clock cycle and a throttled rate for sending packets is a packet every other clock cycle (i.e., a throttled rate of 1:2). These values for the full rate and the throttled rate are merely examples and some embodiments use different values.

The communications in FIG. 6 start when each of N1 and N2 sends a packet destined for N0 via the respective unidirectional communication links in a first clock cycle. As described above, N2 sends the packet to N1 so that N1 can forward the packet to N0 in a second clock cycle. Upon sending the packets, a controller in each of N1 and N2 increments a respective count of packets sent, which is shown to the right of the swim lane line for each of nodes N1 and N2 (a few values of N2's count of packets sent are labeled in FIG. 2). In addition, in the first clock cycle, N0 passes the control token to N1.

Upon receiving the control token, a controller in N1 determines both that: N1 has its own packets to send and N1's count of packets sent is below the minimum threshold. N1 therefore holds the control token, i.e., does not immediately pass the control token to N2. The holding of the control token is shown via a cross-hatched bar in the swim lane for N1. By holding the control token, N1 prevents N2 from resetting N2's count of packets sent.

In clock cycles 2-5, N2 sends packets to N1 to be forwarded to N0. Because the count of packets sent for N2 is lower than the minimum threshold in these cycles, N2 sends packets at the full rate, i.e., one packet per clock cycle. N2 also increments N2's count of packets sent in each clock cycle in which a packet is sent. Because N1 receives and forwards packets from N2 in cycles 2-5, N1 is unable to send N1's own packets, but continues to hold the control token. In clock cycles 5-12, because N2's count of packets sent is greater than the minimum threshold, N2 sends packets at the throttled rate. N2 therefore sends packets in clock cycles 7, 9, and 11—incrementing N2's count of packets sent accordingly. In clock cycles where a packet is not received from N2, i.e., clock cycles 6, 8, and 10, N1 is able to send N1's own packets. N1 increments N1's count of packets sent in each clock cycle in which N1 sends a packet.

In clock cycle 12, after sending a packet, N2 increments N2's count of packets sent to a value equal to the maximum threshold. Because N2's count of packets sent equals the maximum threshold, N2 halts sending packets (shown via the label HALTED in FIG. 6). Also in clock cycle 12, N1 sends sufficient packets to increment N1's count of packets sent to the minimum threshold value, which means that N1 zeroes/resets N1's count of packets sent and passes the control token to N2.

Upon receiving the control token, N2 determines that the count of packets sent is greater than the minimum threshold value, and thus the control token is not to be held. N2 therefore zeroes/resets N2's count of packets sent and passes the control token to N0 (which is shown on the left and right sides of FIG. 6 for clarity). When N2 zeroes/resets N2's count of packets sent, it enables N2 to again send packets at the full rate, which N2 does from clock cycles 15-19, incrementing N2's count of packets sent. In clock cycle 19, N2 again has a count of packets sent that is equal to the minimum threshold value, so N2 commences sending packets at the throttled rate. As N2 sends packets at the throttled rate, N1 is able to send packets in alternating clock cycles.

Control Token Crossover in Multi-Topology Communication Network

Figure 7:
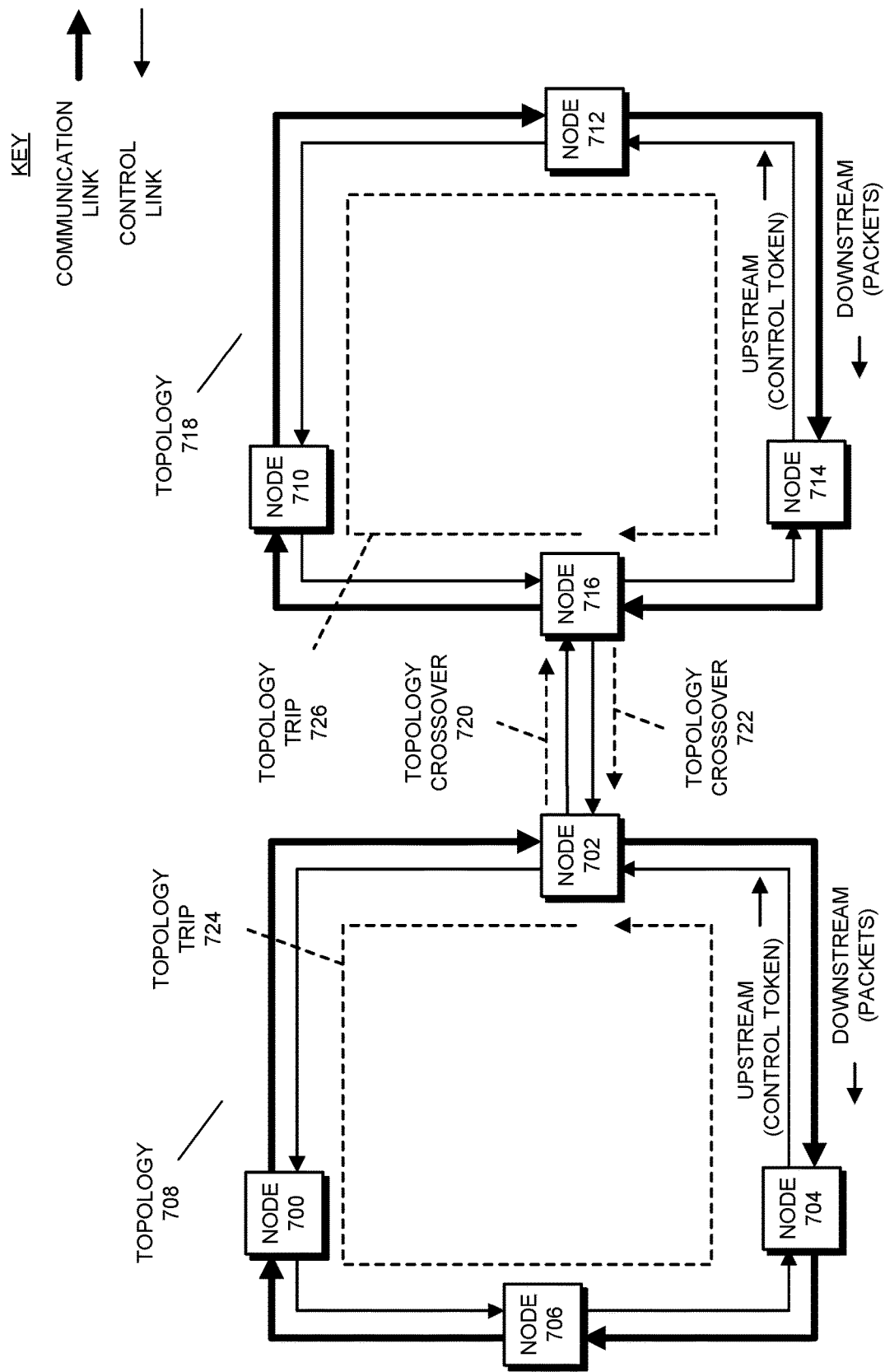
FIG. 7 presents a block diagram illustrating nodes in a first topology and nodes in a second topology with a control token crossover link in accordance with some embodiments.

In some embodiments, the above-described mechanisms for using a control token to ensure forward progress for nodes in topology in a communication network are extended to nodes in multiple topologies. FIG. 7 presents a block diagram illustrating nodes 700-706 in topology 708 and nodes 710-716 in topology 718 in accordance with some embodiments. Note that the topologies in FIG. 7 and the operations performed by nodes therein are examples of some embodiments. Other embodiments use different topologies (and perhaps two different topologies) and/or perform different operations.

The individual topologies 708 and 718 in FIG. 7 each behave similarly to topology 200 in terms of packets being sent and forwarded downstream and control tokens being passed upstream. In addition, a controller in each node keeps and uses a count of packets sent to determine if and at what rate that node's own packets are to be sent to a downstream neighboring node. The controller in each node also uses the control token as described above—i.e., holds the control token, zeroes the count of packets sent when passing on the control token, etc. In other words, each of the topologies passes the control token from node to node on trips through the topology so that the control token makes complete trips through every node of the topology. This is shown by topology trip 724 in topology 708 and topology trip 726 in topology 718.

Differently than topology 200, the control token is, at the end of each complete trip through each topology, sent to the other topology in order to make a complete trip through that topology. For example, at the end of a topology trip 724 in topology 708 (i.e., through nodes 702-700-706-704 in sequence), the control token is passed by a crossover controller in node 702 to a crossover controller in node 716 via topology crossover 720. The control token then makes a trip through topology 718. Then, at the end of a topology trip 726 in topology 718 (i.e., through nodes 716-714-712-710 in sequence), the control token is passed by a crossover controller in node 716 to a crossover controller in node 702 via topology crossover 722. In this way, the control token passes back and forth between topology 708 and topology 718, separately controlling operations in each topology.

Note that the topology that does not have the control token functions as described above with regard to sending packets based on counts of packets sent. In other words, nodes in that topology will continue to send packets at the full rate and then throttled rate until the respective count of packets sent reaches the maximum threshold value. In some cases, the count of packets sent in nodes will reach the maximum threshold value while the control token is in the other topology—and such nodes will halt sending packets until the control token returns to that topology and that node. In addition, in some embodiments, the threshold values are configured in view of the travel of the control token between both topologies 708 and 718 and the fairness of bandwidth consumption (i.e., in terms of the percentage of bandwidth consumption by each node) within each topology. For example, in some embodiments, the minimum threshold is set equal to the maximum threshold, so that nodes in topologies 708 and 718 are either sending packets at the full rate or are halted when the respective count of packets sent reaches the maximum threshold—and thus the nodes do not use the throttled rate.

In some embodiments, at least one electronic device (e.g., node 100, controller 106, etc.) uses code and/or data stored on a non-transitory computer-readable storage medium to perform some or all of the operations herein described. More specifically, the at least one electronic device reads code and/or data from the computer-readable storage medium and executes the code and/or uses the data when performing the described operations. A computer-readable storage medium can be any device, medium, or combination thereof that stores code and/or data for use by an electronic device. For example, the computer-readable storage medium can include, but is not limited to, volatile and/or non-volatile memory, including flash memory, random access memory (e.g., eDRAM, RAM, SRAM, DRAM, DDR4 SDRAM, etc.), non-volatile RAM (e.g., phase change memory, ferroelectric random access memory, spin-transfer torque random access memory, magnetoresistive random access memory, etc.), read-only memory (ROM), and/or magnetic or optical storage mediums (e.g., disk drives, magnetic tape, CDs, DVDs, etc.).

In some embodiments, one or more hardware modules perform the operations herein described. For example, the hardware modules can include, but are not limited to, one or more processors/cores/central processing units (CPUs), application-specific integrated circuit (ASIC) chips, neural network processors or accelerators, field-programmable gate arrays (FPGAs), compression and/or encoding subsystems, compute units, embedded processors, graphics processors (GPUs)/graphics cores, accelerated processing units (APUs), functional blocks, controllers, accelerators, and/or other programmable-logic devices. When circuitry (e.g., integrated circuit elements, discrete circuit elements, etc.) in such hardware modules is activated, the circuitry performs some or all of the operations. In some embodiments, the hardware modules include general purpose circuitry such as execution pipelines, compute or processing units, etc. that, upon executing instructions (program code, firmware, etc.), perform the operations. In some embodiments, the hardware modules include purpose-specific or dedicated circuitry that performs the operations, possibly including circuitry that performs some or all of the operations without executing instructions.

In some embodiments, a data structure representative of some or all of the functional blocks and circuit elements described herein (e.g., node 100, controller 106, or some portion thereof) is stored on a non-transitory computer-readable storage medium that includes a database or other data structure which can be read by an electronic device and used, directly or indirectly, to fabricate hardware including the functional blocks and circuit elements. For example, the data structure may be a behavioral-level description or register-transfer level (RTL) description of the hardware functionality in a high level design language (HDL) such as Verilog or VHDL. The description may be read by a synthesis tool which may synthesize the description to produce a netlist including a list of transistors/circuit elements from a synthesis library that represent the functionality of the hardware including the above-described functional blocks and circuit elements. The netlist may then be placed and routed to produce a data set describing geometric shapes to be applied to masks. The masks may then be used in various semiconductor fabrication steps to produce a semiconductor circuit or circuits (e.g., integrated circuits) corresponding to the above-described functional blocks and circuit elements. Alternatively, the database on the computer accessible storage medium may be the netlist (with or without the synthesis library) or the data set, as desired, or Graphic Data System (GDS) II data.

In this description, variables or unspecified values (i.e., general descriptions of values without particular instances of the values) are represented by letters such as N, M, and X As used herein, despite possibly using similar letters in different locations in this description, the variables and unspecified values in each case are not necessarily the same, i.e., there may be different variable amounts and values intended for some or all of the general variables and unspecified values. In other words, N and any other letters used to represent variables and unspecified values in this description are not necessarily related to one another.

The expression "et cetera" or "etc." as used herein is intended to present an and/or case, i.e., the equivalent of "at least one of" the elements in a list with which the etc. is associated. For example, in the statement "the electronic device performs a first operation, a second operation, etc.," the electronic device performs at least one of the first operation, the second operation, and other operations. In addition, the elements in a list associated with an etc. are merely examples from among a set of examples—and at least some of the examples may not appear in some embodiments.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the embodiments. The scope of the embodiments is defined by the appended claims.

What is claimed is:

1. A communication network, comprising:
   a plurality of nodes configured in a topology, each node having an upstream neighboring node and a downstream neighboring node in the topology;
   a separate unidirectional communication link coupled between each node and that node's downstream neighboring node, wherein packets sent from nodes in the topology are forwarded from node to node via corresponding unidirectional communication links until reaching destination nodes; and
   a controller in each node, wherein the controller in each node is configured to:
      keep a count of packets sent by that node;
      use the count of packets sent to determine whether a given packet is to be sent from that node to the downstream neighboring node by determining that: packets are not allowed to be sent when the count of packets sent is equal to a maximum threshold, packets are to be sent at the throttled rate when the count of packets sent is equal to or greater than a minimum threshold but less than the maximum threshold, and packets are to be sent at the full rate when the count of packets sent is less than the minimum threshold; and
      based at least in part on the determining, selectively send the given packet to the downstream neighboring node.

2. The communication network of claim 1, wherein:
   sending packets at the full rate includes sending a packet in each cycle of a controlling clock when a packet is available to be sent; and
   sending packets at the throttled rate includes sending a packet in fewer than each cycle of a controlling clock when a packet is available to be sent.

3. The communication network of claim 2, wherein sending a packet in fewer than each cycle of the controlling clock includes:
   sending packets at variable rates in terms of clock cycles per packet based at least in part on a value of the count of packets sent between the minimum threshold and the maximum threshold, wherein:
      higher rates are used when the value of the count of packets sent is closer to the minimum threshold; and
      lower rates are used when the value of the count of packets sent is closer to the maximum threshold.

4. The communication network of claim 1, wherein the controller in each node or another entity is configured to dynamically set at least one of the respective minimum threshold and the maximum threshold based on one or more operating criteria.

5. The communication network of claim 1, further comprising:
   a separate unidirectional control link coupled between each node and that node's upstream neighboring node, wherein a control token is passed from node to node in the topology via the unidirectional control links;
   wherein, for keeping a count of packets sent by each node, the controller in that node is configured to:
      increment a respective count of packets sent upon sending each packet; and
      set the respective count of packets sent to zero upon passing the control token to the upstream neighboring node.

6. The communication network of claim 1, wherein the controller in each node is configured to:
   receive packets destined for an other node from that node's upstream neighboring node via the unidirectional communication link between the upstream neighboring node and that node; and
   forward the packets to that node's downstream neighboring node via the unidirectional communication link between that node and the downstream neighboring node;
   wherein, while forwarding packets received from the upstream neighboring node, that node is unable to send that node's own packets to the downstream neighboring node.

7. The communication network of claim 1, further comprising:
   a separate unidirectional control link coupled between each node and that node's upstream neighboring node, wherein a control token is passed from node to node in the topology via the unidirectional control links;
   wherein each controller is configured to, upon being passed the control token from the downstream neighboring node:
      determine a respective count of packets sent;
      determine whether that node has packets to be sent;
      when the respective count of packets sent is equal to or greater than a minimum threshold or the node has no packets to send, that controller is configured to:
         zero the respective count of packets sent; and
         pass the control token to the upstream neighboring node; and
      when the respective count of packets sent is less than a minimum threshold and the node has packets to send, that controller is configured to:
         hold the control token; and
         send packets to the downstream neighboring node via the unidirectional communication link between that node and the downstream neighboring node in cycles of a controlling clock in which that node is not forwarding packets received from the upstream neighboring node.

8. The communication network of claim 7, wherein:
upon sending each packet to a given node that is holding the control token, a particular upstream neighboring node is configured to increment a respective count of packets sent; and
when the particular upstream neighboring node has sent sufficient packets to increment the respective count of packets sent to be equal to a maximum threshold value, the particular upstream neighboring node is configured to halt sending packets, thereby avoiding sending packets to the given node that block the given node from sending the given node's own packets and freeing the given node to make forward progress in sending the given node's own packets.

9. The communication network of claim 1, further comprising:
a separate unidirectional control link coupled between each node and that node's upstream neighboring node, wherein a control token is passed from node to node in the topology via the unidirectional control links;
wherein the control token is passed from node to node in the topology in a first direction on the unidirectional control links, the first direction being opposite to a second direction in which packets are sent and forwarded between nodes in the topology on the unidirectional communication links.

10. The communication network of claim 1, wherein the topology is or is included in a ring, a mesh, or a star topology.

11. A communication network, comprising:
a plurality of first topology nodes configured in a first topology, each first topology node having: an upstream neighboring first topology node and a downstream neighboring first topology node in the first topology, a separate unidirectional communication link coupled between that first topology node and that first topology node's downstream neighboring first topology node, and a separate unidirectional control link coupled between that first topology node and that first topology node's upstream neighboring first topology node, wherein packets sent from first topology nodes are forwarded from first topology node to first topology node in the first topology via corresponding unidirectional communication links until reaching destination first topology nodes;
a plurality of second topology nodes configured in a second topology, each second topology node having: an upstream neighboring second topology node and a downstream neighboring second topology node in the second topology, a separate unidirectional communication link coupled between that second topology node and that second topology node's downstream neighboring second topology node, and a separate unidirectional control link coupled between that second topology node and that second topology node's upstream neighboring second topology node, wherein packets sent from second topology nodes are forwarded from second topology node to second topology node in the second topology via corresponding unidirectional communication links until reaching destination second topology nodes; and
a controller in each first topology node and second topology node, each controller passing a control token from node to node in the respective topology via the unidirectional control links, the control token being used to ensure forward progress in sending packets from the nodes via the respective communication, wherein:
a first controller in one of the first topology nodes and a second controller in one of the second topology nodes are crossover controllers that exchange the control token after each trip through the respective topology, so that each crossover controller sends the control token to an other topology of the first topology or the second topology for a trip through the other topology; and
the controller in each first topology node and each second topology node:
keeps a count of packets sent by that node;
uses the count of packets sent to determine whether a given packet is allowed to be sent from that node to that node's downstream neighboring node by determining that: packets are not allowed to be sent when the count of packets sent is equal to a maximum threshold, packets are to be sent at the throttled rate when the count of packets sent is equal to or greater than a minimum threshold but less than the maximum threshold, and packets are to be sent at the full rate when the count of packets sent is less than the minimum threshold; and
based at least in part on the determining, selectively sends the given packet to that node's downstream neighboring node.

12. The communication network of claim 11, wherein:
sending packets at the full rate involves sending a packet in each cycle of a controlling clock when a packet is available to be sent; and
sending packets at the throttled rate involves sending a packet in fewer than each cycle of a controlling clock when a packet is available to be sent.

13. The communication network of claim 12, wherein sending a packet in fewer than each cycle of the controlling clock includes:
sending packets at variable rates in terms of clock cycles per packet based at least in part on a value of the count of packets sent between the minimum threshold and the maximum threshold, wherein:
higher rates are used when the value of the count of packets sent is closer to the minimum threshold; and
lower rates are used when the value of the count of packets sent is closer to the maximum threshold.

14. The communication network of claim 11, the controller in each node or another entity dynamically sets at least one of the respective minimum threshold and the maximum threshold based on one or more operating criteria.

15. The communication network of claim 11, wherein, for keeping a count of packets sent by each first topology node and each second topology node, the controller in that node:
increments a respective count of packets sent upon sending each packet; and
sets the respective count of packets sent to zero upon passing the control token to the upstream neighboring node.

16. The communication network of claim 11, wherein the controller in each first topology node and each second topology node is configured to:
receive packets destined for an other node from that node's upstream neighboring node via the unidirectional communication link between that node's upstream neighboring node and that node; and forward the packets to that node's downstream neighboring node via the unidirectional communication link between that node and that node's downstream neighboring node;

wherein, while forwarding packets received from the upstream neighboring node, that node is unable to send that node's own packets to the downstream neighboring node.

17. The communication network of claim 11, wherein the controller in each first topology node and each second topology node, upon being passed the control token from that node's downstream neighboring node is configured to:
determine a respective count of packets sent by that node;
determine whether that node has packets to be sent;
when the respective count of packets sent is equal to or greater than a minimum threshold or that node has no packets to send, that controller is configured to:
zero the respective count of packets sent; and
pass the control token to that node's upstream neighboring node; and
when the respective count of packets sent is less than a minimum threshold and that node has packets to send, that controller is configured to:
hold the control token; and
send packets to that node's downstream neighboring node via the unidirectional communication link between that node and that node's downstream neighboring node in cycles of a controlling clock in which that node is not forwarding packets received from that node's upstream neighboring node.

18. The communication network of claim 17, wherein:
upon sending each packet to a given node that is holding the control token, a particular upstream neighboring first topology node or second topology node increments a respective count of packets sent; and when the particular upstream neighboring first topology node or second topology node has sent sufficient packets to increment the respective count of packets sent to be equal to a maximum threshold value, the particular upstream neighboring first topology node or second topology node halts sending packets, thereby avoiding sending packets to the given node that block the given node from sending the given node's own packets and freeing the given node to make forward progress in sending the given node's own packets.

19. The communication network of claim 11, wherein:
the control token is passed from first topology node to first topology node in the first topology in a first direction on the unidirectional control links, the first direction being opposite to a second direction in which packets are sent and forwarded between first topology nodes in the first topology on the unidirectional communication links; and the control token is passed from second topology node to second topology node in the second topology in a third direction on the unidirectional control links, the third direction being opposite to a fourth direction in which packets are sent and forwarded between second topology nodes in the second topology on the unidirectional communication links.

20. The communication network of claim 11, wherein the first topology and/or the second topology is or is included in a ring, a mesh, or a star topology.

* * * * *